No. 875,304.
PATENTED DEC. 31, 1907.
W. H. WILKENING.
PIPE, TUBE, AND TUBULAR STRUCTURE.
APPLICATION FILED JUNE 5, 1907.
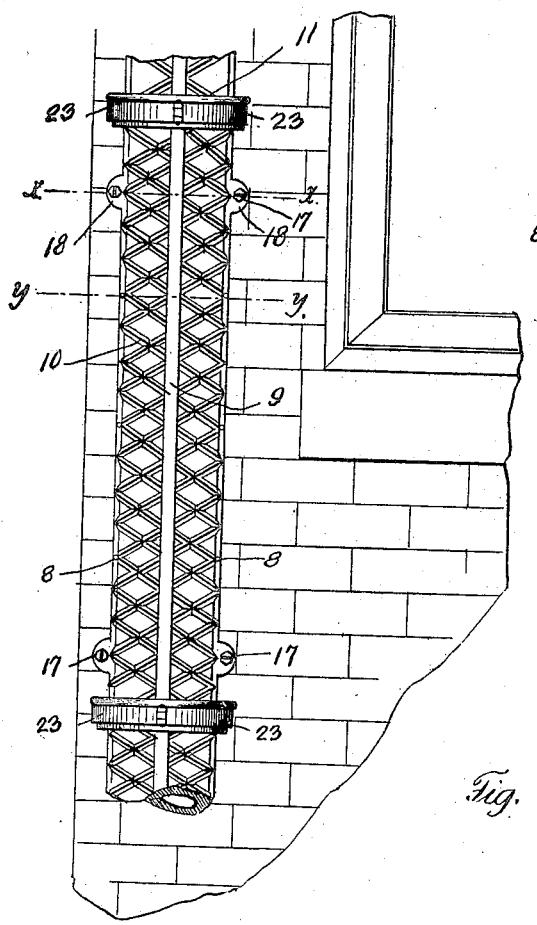
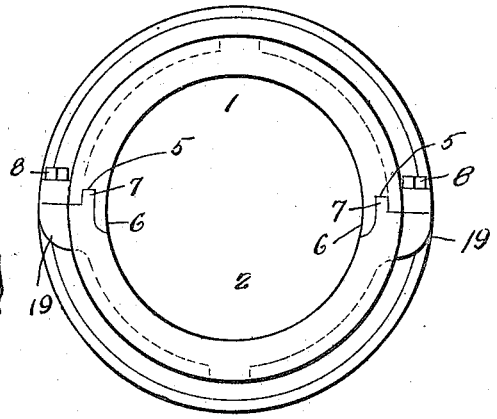
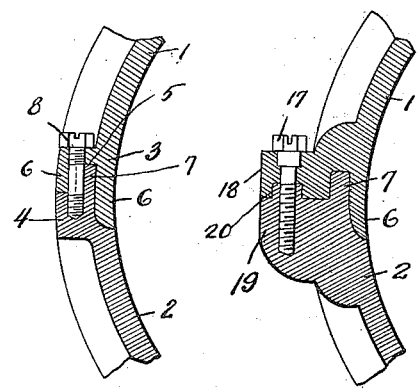
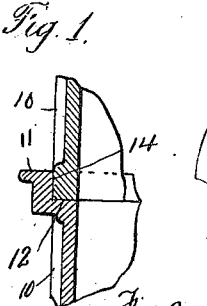
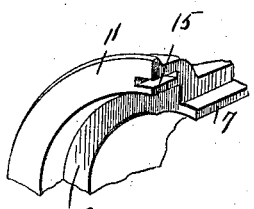
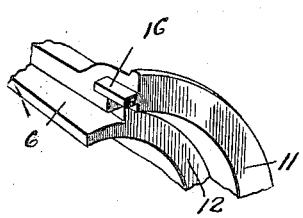
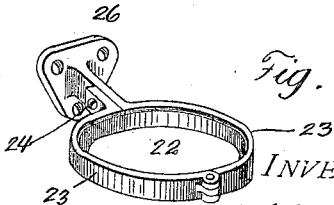
WITNESSES:
Samuel Payne.
INVENTOR
W. H. Wilkening.
By N. C. Everett
Attorneys

UNITED STATES PATENT OFFICE.

WILLIAM H. WILKENING, OF PITTSBURG, PENNSYLVANIA.

PIPE, TUBE, AND TUBULAR STRUCTURE.

No. 875,304.  Specification of Letters Patent.  Patented Dec. 31, 1907.

Application filed June 5, 1907. Serial No. 377,422.

*To all whom it may concern:*

Be it known that I, WILLIAM H. WILKENING, a citizen of the United States of America, residing at Pittsburg, in the county of Allegheny and State of Pennsylvania, have invented certain new and useful Improvements in Pipes, Tubes, and Tubular Structures, of which the following is a specification, reference being had therein to the accompanying drawing.

This invention relates to improvements in pipes, tubes and tubular structures, particularly designed for culverts, water and sewer conduits.

My invention has for its object to provide a sectional pipe or conduit, having a reinforced exterior surface, insuring rigidity and durability.

My invention aims to provide a cast iron pipe made of two semi-cylindrical sections, having longitudinally disposed interlocking edges. These sections of the pipe are reinforced by longitudinally disposed ribs, together with intersecting ribs advantageously disposed upon the exterior of the sections to prevent cracking or bursting due to the contents of the pipe being under pressure.

My improved pipe can be used as spouting, and in this connection, I have devised a novel bracket or fastener for securing the same to a building.

The detailed construction entering into my invention will be presently described and then specifically pointed out in the appended claims.

Referring to the drawing for part of this specification, like numerals of reference, designating corresponding parts throughout the several views of the drawing, in which Figure 1 is an elevation of a pipe used as a spout and secured to the wall of a building. Fig. 2 is an end view of a pipe. Fig. 3 is a cross sectional view of a portion of a pipe taken on the line *y—y* of Fig. 1. Fig. 4 is a similar view taken on the line *x—x* of Fig. 1. Fig. 5 is a perspective view of a portion of the confronting edges of the sections of a pipe at the end thereof. Fig. 6 is a perspective view of a clamp or bracket used for supporting a pipe. Fig. 7 is a perspective view of a modified form of clamp or bracket, and Fig. 8 is a fragmentary longitudinal sectional view of a pipe, illustrating a joint.

In the accompanying drawing 1 and 2 designate semi-cylindrical sections of a pipe adapted to have their edges secured together to provide a tubular structure as a spout or culvert. The confronting longitudinally disposed edges of the sections 1 and 2 are enlarged, as at 3 and 4, the enlargement 3 of the section 1 being provided with a longitudinally disposed groove 5 forming tongues 6, said tongues embracing a longitudinally disposed tongue 7, carried by the enlargement 4 of the section 2 and fitting into the groove 5 of the section 1. These interlocking edges are secured together at intervals by screw bolts 8, passing through the enlargement 6 of the section 1 into the enlargement 4 of the section 2. These sections 1 and 2 have their exterior surface provided with longitudinally disposed reinforcing ribs 9, said ribs being formed intermediate the edges of said sections. Between said ribs and the enlargements 3 and 4 of the sections 1 and 2, I arrange a plurality of intersecting reinforcing ribs 10, said ribs providing a reinforcing network for protecting the sections, and at the same time insuring stability of a pipe constructed in accordance with my invention.

A pipe formed of two sections, as above described is stripped of the reinforcing ribs and enlargements at one end, in order that said end of the pipe can fit in an adjoining pipe. The opposite end of the pipe is provided with the peripheral enlargement 11 providing a seat 12 for the stripped end 14 of an adjoining pipe. The enlargements 11 are also provided with groove 15 for tongue 16, said tongue and groove being used for connecting the ends of the sections 1 and 2 together, as it is practically impossible to extend the tongue 6 and 7 into the seat 12 of the enlargement 11.

Besides using the screw bolts 8 for connecting confronting edges of the sections 1 and 2, I use screw bolts 17, said bolts passing through lugs 18, carried by the section 1 adjacent to its ends, and extending into lugs 19, carried by the section 2 adjacent to its ends. The lugs 18 and 19 are further locked together by projections 20 entering the lugs 18.

When a pipe is used as a spout or is suspended or fixed in a position other than horizontal in the ground or upon a suitable support, I use clamps or brackets 21 and 22, said clamps or brackets comprising hinged members 23 secured together as at 24, and adapted to embrace the adjoining ends of two pipes. The clamp or bracket 21 has one of its members 23 provided with a spike end 25, while the modified clamp or bracket 22 has one of its members provided with a pierced plate 26. The spike end 25 is adapted to be driven between the bricks of a building or into the frame work thereof, while the pierced plate 26 is secured to the building by screws or nails.

It will be apparent from the illustration of my invention that I have devised a novel sectional pipe. It can be used for various purposes other than those above specified.

It is thought that the construction and manner of assembling the sections of the pipe will be fully understood, and it is obvious that such changes in the size, proportion and minor details of construction, as permissible by the appended claims, can be resorted to, without departing from the spirit and scope of the invention.

Having fully described my invention, what I claim and desire to secure by Letters Patent is:

1. A pipe consisting of two semi-cylindical sections, having interlocking longitudinally disposed edges, longitudinally disposed reinforcing ribs carried by said sections, intersecting reinforcing ribs arranged between the first mentioned ribs and the interlocking edges of said sections, screw bolts mounted in the interlocking edges of said sections, interlocking enlargements carried by the ends of said sections and providing a seat for an adjoining pipe, and clamps embracing said enlargements for supporting said pipes.

2. A pipe made of cast iron and consisting of two sections having interlocking edges bolted together, longitudinally disposed reinforcing ribs carried by said sections, intersecting reinforcing ribs carried by said sections, interlocking enlargements carried by said sections and providing a seat for an adjoining pipe, and means for supporting said pipe in a vertical position.

3. A pipe consisting of reinforced semi-cylindical sections having interlocking and bolted longitudinal edges, interlocking annular peripheral enlargements carried by said sections for receiving the adjoining end of a pipe, and means for embracing and supporting the ends of said sections.

4. A pipe comprising a plurality of sections having the longitudinal edges interlocking and bolted together, peripherally disposed reinforcing ribs carried by each of the sections, and interlocking enlargements carried by said sections and provided with a seat for an adjoining pipe.

5. A pipe comprising a plurality of sections having the longitudinal edges interlocking and bolted together, peripherally disposed reinforcing ribs carried by each of the sections, interlocking enlargements carried by said sections and provided with a seat for an adjoining pipe, and means for supporting said pipe in abutting position.

In testimony whereof I affix my signature in the presence of two witnesses:

WILLIAM H. WILKENING.

Witnesses:
MAX H. SROLOVITZ.
A. J. TRIGG.